United States Patent [19]

Sakazaki et al.

[11] Patent Number: 5,648,960
[45] Date of Patent: Jul. 15, 1997

[54] RECORDING/REPRODUCING APPARATUS FOR DATA PACKET STREAM

[75] Inventors: Yoshihisa Sakazaki; Shuji Abe, both of Kanagawa-ken, Japan

[73] Assignee: Kabushiki Kaisha Toshiba, Kawasaki, Japan

[21] Appl. No.: 554,777

[22] Filed: Nov. 7, 1995

[30] Foreign Application Priority Data

Nov. 7, 1994 [JP] Japan ............... 6-272621

[51] Int. Cl.$^6$ ............... H04L 12/56
[52] U.S. Cl. ............... 370/498; 370/528; 386/46
[58] Field of Search ............... 370/60, 60.1, 94.1, 370/94.2, 84, 99, 498, 528; 348/390, 426, 467; 358/339, 342; 360/39, 18, 21; 386/1, 46, 109

[56] References Cited

U.S. PATENT DOCUMENTS

| | | | |
|---|---|---|---|
| 4,071,706 | 1/1978 | Warren | 370/94.1 |
| 5,233,603 | 8/1993 | Takeuchi et al. | 370/60 |
| 5,337,313 | 8/1994 | Buchholz et al. | 370/94.1 |
| 5,371,547 | 12/1994 | Siracusa et al. | 348/426 |
| 5,444,575 | 8/1995 | Augenbraun et al. | 360/64 |
| 5,459,789 | 10/1995 | Tamer et al. | 380/20 |
| 5,519,504 | 5/1996 | Keesen | 360/39 |
| 5,543,932 | 8/1996 | Chang et al. | 358/335 |
| 5,570,088 | 10/1996 | Rhodes | 341/50 |

OTHER PUBLICATIONS

Azadegan, et al. "Data–Placement Procedure For Multi–Speed Digital VCR", IEEE Transactions on Consumer Electroics, vol. 40, No. 3, Aug. 1994, pp. 250–256.

*Primary Examiner*—Hassan Kizou
*Assistant Examiner*—Kwang Bin Yao
*Attorney, Agent, or Firm*—Cushman, Darby & Cushman IP Group of Pillsbury Madison & Sutro LLP

[57] ABSTRACT

A recording/reproducing apparatus for a data packet stream having an extractor for extracting data packets of a selected type from an input packet train in which different types of data packets have been time-division multiplexed together. The apparatus also has a recording circuit for recording the extracted data packets, and a reproducing circuit for reproducing the recorded extracted data packets. A dummy packet producer, which produces dummy packets that correspond to data packets that have not been extracted, is also provided. Further, the apparatus has an output circuit that outputs an output data packet train. The output data packet train is produced by combining the reproduced extracted data packets and the dummy packets in accordance with the order in which the different types of data packets are positioned within the input packet train.

22 Claims, 5 Drawing Sheets

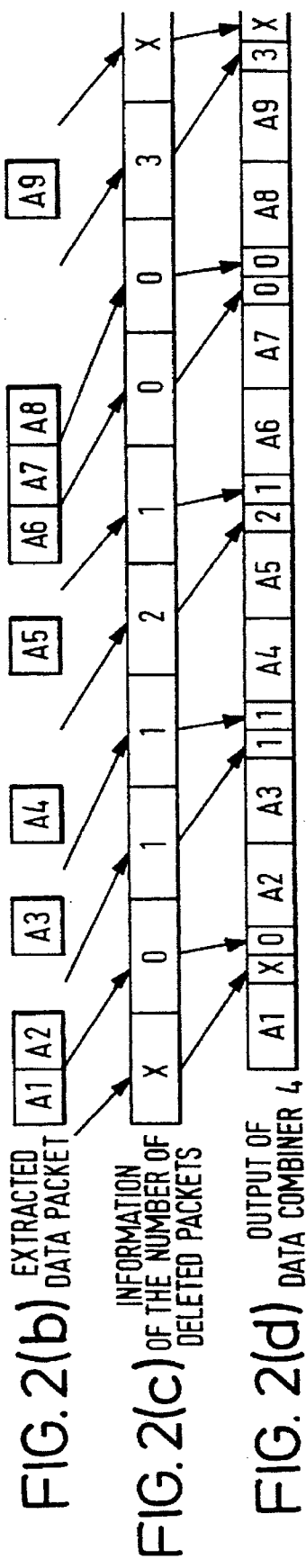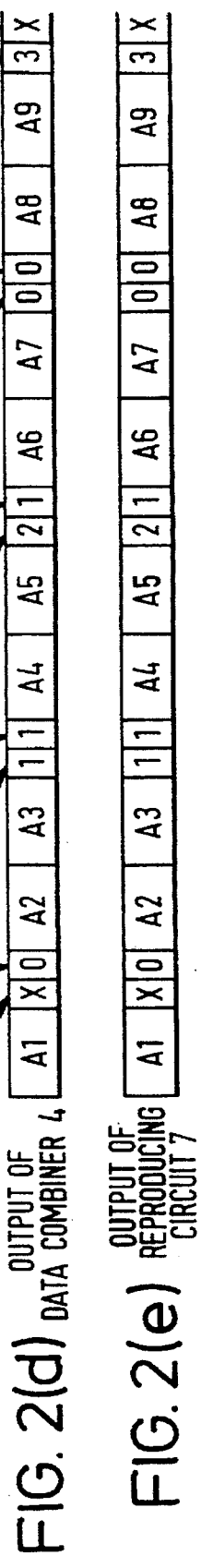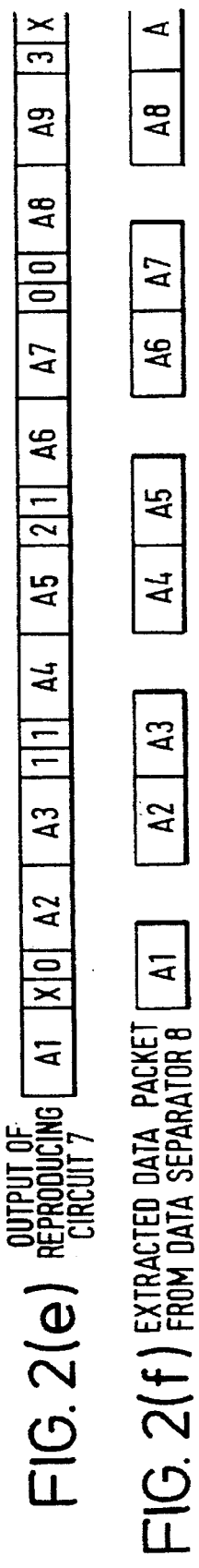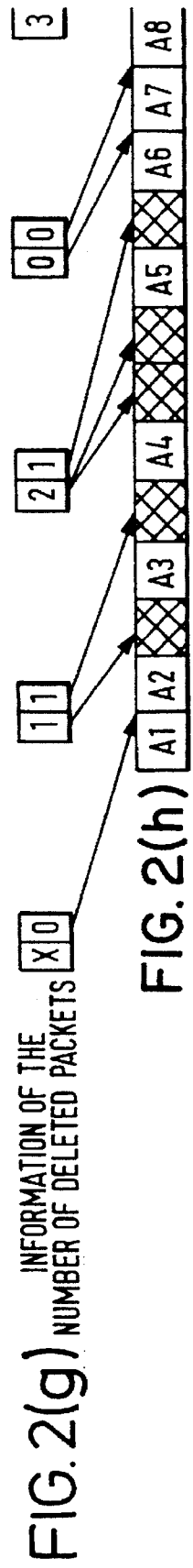
FIG. 2(a) INPUT DATA PACKET STREAM
FIG. 2(b) EXTRACTED DATA PACKET
FIG. 2(c) INFORMATION OF THE NUMBER OF DELETED PACKETS
FIG. 2(d) OUTPUT OF DATA COMBINER 4
FIG. 2(e) OUTPUT OF REPRODUCING CIRCUIT 7
FIG. 2(f) EXTRACTED DATA PACKET FROM DATA SEPARATOR 8
FIG. 2(g) INFORMATION OF THE NUMBER OF DELETED PACKETS
FIG. 2(h)

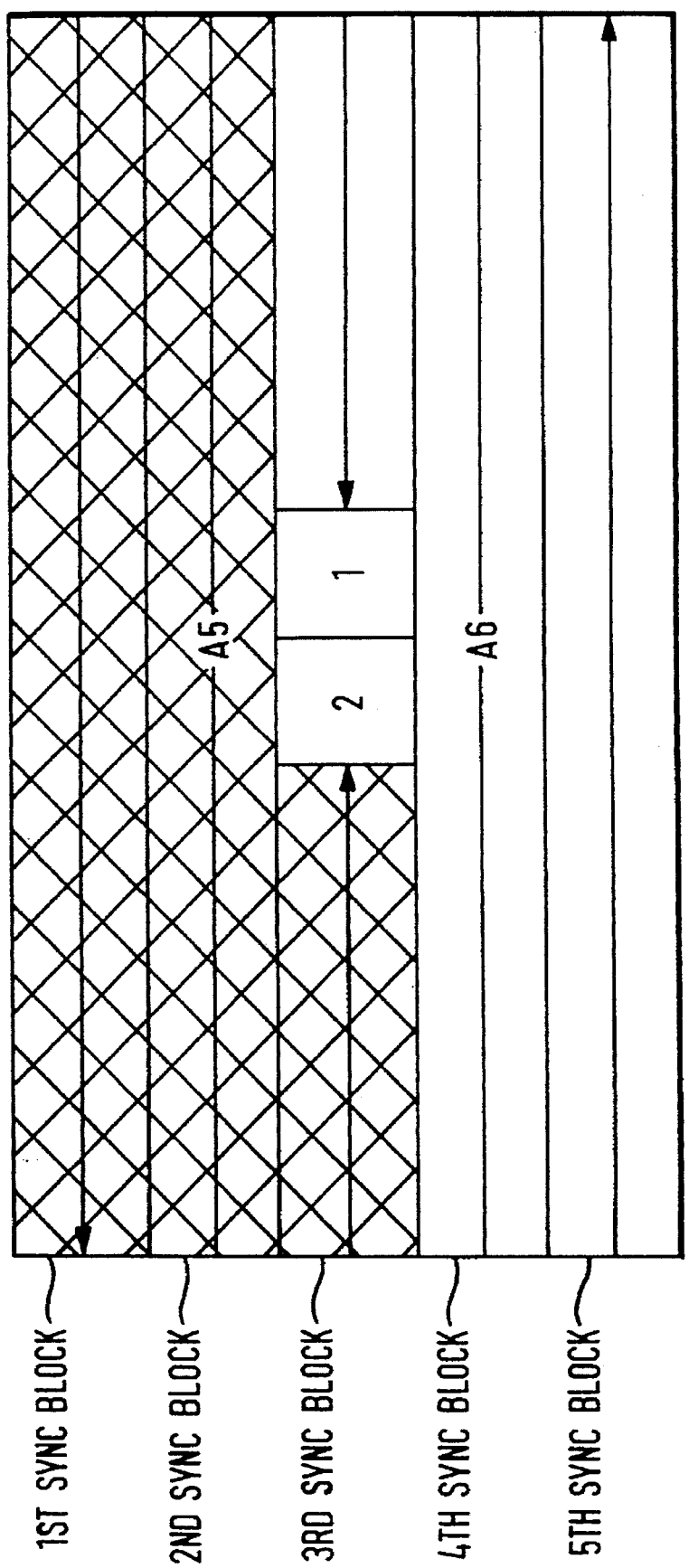

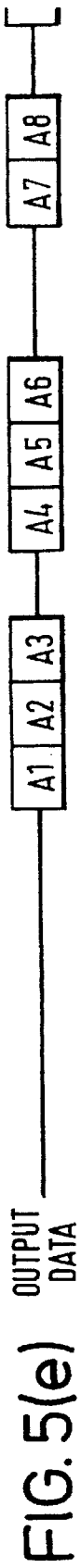
PRIOR ART
FIG. 5(a) RECEIVED DATA
FIG. 5(b) PACKETS TO BE EXTRACTED
FIG. 5(c) RECORDING DATA
FIG. 5(d) REPRODUCED DATA
FIG. 5(e) OUTPUT DATA

RECORDING/REPRODUCING APPARATUS FOR DATA PACKET STREAM

FIELD OF THE INVENTION

The present invention relates to a recording/reproducing apparatus for a data packet stream adapted for use with multichannel data.

BACKGROUND OF THE INVENTION

Digital processing of images has developed greatly in recent years along with image compression techniques such as the MPEG2 (Moving Picture Experts Group 2) system. Also, television broadcasting systems that use digital broadcasting systems that have adopted the MPEG2 system has been studied. Further, multimedia services that are capable of providing various information services in terms of images in response to user demands by integrally handling audio and video data have begun to develop.

The MPEG2 system is being adapted for multichannel broadcasting and multimedia service within the fields of communications or storage media. To facilitate time-division multiplexing of a plurality of video and audio data, the MPEG2 carries information in packets. One packet is comprised of the same type of information data as well as an identification data that indicates the type of information data.

FIG. 4 shows the construction of a transport data packet that has been defined using the MPEG2 standard.

The transport data packet is adapted to multiprogram (multichannel data) in which desired program packets can be extracted during decoding from a plurality of programs transmitted in the time-division multiplex system. For extracting the desired data packets, transport data packets have a Link Level Header added prior to a payload for carrying information. Four of the 188 bytes of the transport data packet are assigned for the Link Level Header. Further, several transport data packets constitute a PES (Packetized Elementary Stream) packet.

The Link Level Header has a Sync byte, followed by a Transport Data Packet Error Indicator that indicates the presence or absence of a bit error, a PES packet start indicator that indicates the starting point of a PES packet, a Transport Data Packet Priority that indicates a priority of packets, a PID (Packet Identification) that identifies packets, a Transport Data Scrambling Control that indicates the presence or absence of scrambles, an Adaptation Field Control that indicates the presence or absence of payloads, etc., and a Continuity Counter that indicates the number of the same PIDs in contiguous sequence.

An MPEG2 decoder functions to extract the same PID packets in reference to the PIDs. Thus, the MPEG2 decoder decodes only desired programs from the transmission data. For instance, even when transport data streams having coded data of a plurality of images A, B, C, . . . are input, the decoder is able to display only the desired image on a television receiver that conforms to the MPEG2 standard.

It is desirable to extract only desired packet from a transport data stream transmitted according to the MPEG2 standard and to record the extracted packets on a VTR (Video Tape Recorder). FIG. 5 is a diagram for illustrating the processing that occurs in this case. FIG. 5(a) shows received data (a transport data stream). FIG. 5(b) shows the packets that are to be extracted. FIG. 5(c) shows recording the extracted data. FIG. 5(d) shows a reproduced data train and FIG. 5(e) shows output data.

In this example, received data contains two types of images A, B, which have been coded and formed into packets A1, A2, . . . B1, B2, . . . . Then they are transmitted as a MPEG2 system transport data stream. Because the decoding time in the MPEG decoder differs in response to the contents of data, the received data is stored in a buffer in order to absorb the differences in processing times. The capacity of this buffer has been specified by the MPEG2 standard and the MPEG2 encoder controls transmission of the data in accordance with the processing time of the MPEG2 decoder so that overflows or underflows do not occur in the buffer. In other words, the number of the same type of packets in contiguous sequence has been decided by the MPEG2 decoder based on the decoding time of each packet. For example, the transmission data, as shown in FIG. 5(a), indicates that a transmission time of 3 packets may be needed for the decoding of packets A1 and A2.

If only packets A1, A2, A3 . . . of image A are extracted and recorded, as shown in FIG. 5(a), a signal rate of ½ of the transmission rate will be needed to record the packets. In other words, a recording signal is produced by changing a rate so that the data packet A1, A2, . . . are continuous in time, as shown in FIG. 5(c).

The reproduced signal in this case is reproduced at half of the transmission rate, as shown in FIG. 5(d). For decoding (i.e., supplying the reproduced signal to the MPEG2 decoder) the reproduced signal rate is restored to the original transmission rate, thereby producing output data. In this example, the reproduced packets A1, A2, . . . are either output at equal intervals or output by arranging them in the manner shown in FIG. 5(e). However, as described above, the image A is normally decoded (i.e., when recording and reproducing has not taken place) in the MPEG2 decoder using the transmission times of the packets B1, B2, . . . which are based on the image B, to ensure there is sufficient time to decode one packet before the next packet arrives. Thus, if the packets A1, A2, . . . are decoded at an interval that differs from transmission data, the buffer of the MPEG2 decoder may overflow or enter an underflow situation. As described above, information regarding the processing time required for decoding is not contained within the transport data packets, and therefore it is not possible to decode the data at the same packet interval as transmission data once the data has been extracted. Further, if the reproduced data is transmitted in a burst, the detection of the start of packets, etc. by the MPEG2 decoder becomes unstable.

As described above, even when selectively recording or reproducing any data from transmitted data and outputting data by restoring the rate of the reproduced signal to the original transmission rate, the decoding processing time for the extracted data is unknown. In addition, the prescribed time interval between packets of extracted data cannot be brought into accordance with a transmission data rate, and thus a buffer overflow or underflow may occur. Further, there is also a problem in detecting the start of the packets, etc.

SUMMARY OF THE INVENTION

It is, therefore, an object of the present invention to provide a recording/reproducing apparatus for a data packet stream that is capable of preventing overflows or underflows in the buffers of the decoders coder by controlling an output rate of the reproduced data.

Another object of the present invention is to provide a recording/reproducing apparatus for a data packet stream that is capable of stabilizing the processing of the decoder by controlling an output rate of the reproduced data.

In order to achieve the above object, a recording/reproducing apparatus for a data packet stream according to one aspect of the present invention includes: an extractor for extracting one or more types of data packets from an input packet train in which different types of data packets have been time-division multiplexed with each other; a recording circuit for recording the extracted data packets; a reproducing circuit for reproducing the extracted data packets recorded by the recording circuit; a dummy packet producer for producing dummy packets that correspond to non-extracted data packets; and an output circuit for outputting an output data packet train, produced by combining the extracted data packets and the dummy packets in accordance with the order the packets were positioned within the input packet train.

A recording/reproducing apparatus for a data packet stream according to another aspect of the present invention includes: an extractor for extracting one or more types of data packets from an input packet train in which different types of data packets have been time-division multiplexed with each other so as to output them as the extracted data packets; a deleted packet detector for detecting the number of data packets of non-extracted data in contiguous sequence lying between the extracted data so as to output the information of the deleted packets; a combiner for combining the extracted data with the information of the deleted packets; a recording circuit for recording the output from the combiner; a reproducing circuit for reproducing data recorded by the recording circuit; a separator for separating the extracted data and the information of the number of deleted packets in contiguous sequence from the reproduced data; a dummy packet producer for producing dummy packets that correspond to non-extracted data packet; and an output circuit for outputting an output data packet train, produced by combining the extracted data packets and the dummy packets in accordance with the order of the packets in the input packet train.

In the recording/reproducing apparatus for a data packet stream according to the first aspect of the present invention, on ore more types of data are extracted by the extractor and recorded by the recording circuit. The extracted data reproduced by the reproducing circuit are supplied to the output circuit, wherein the extracted data is combined with the dummy packets. Thus, it becomes possible to make a transmission rate at prescribed time intervals of the output data train from the output circuit at a rate based on the rate of the input data train.

In the recording/reproducing apparatus for a data packet stream according to the second aspect of the present invention, the number of data packets of non-extracted data in contiguous sequence between the data that is extracted by the extractor are detected by the deleted packet detector. This information is combined with the extracted data by the combiner and the output of the combiner is recorded by the recording circuit. The extracted data and the information of the number of deleted packets in contiguous sequence is separated after being reproduced by the reproducing circuit. The output circuit outputs the extracted data while inserting dummy packets therebetween based on the information of the number of data packets in contiguous sequence. Thus, the resulting output data train contains extracted data at the same time intervals that such data was contained within the input data train.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes further understood by reference to the following detailed description when considered in connection with the accompanying drawings, wherein:

FIG. 2 is a diagram illustrating the operation of the embodiment of FIG. 1;

FIG. 3 is a diagram also illustrating the operation of the embodiment of FIG. 1;

FIG. 5 is a diagram illustrating problems within the prior art.

DESCRIPTION OF THE PREFERRED EMBODIMENTS

Preferred embodiments of the present invention will be described in detail with reference to FIGS. 1, 2 and 3.

Figure 1:
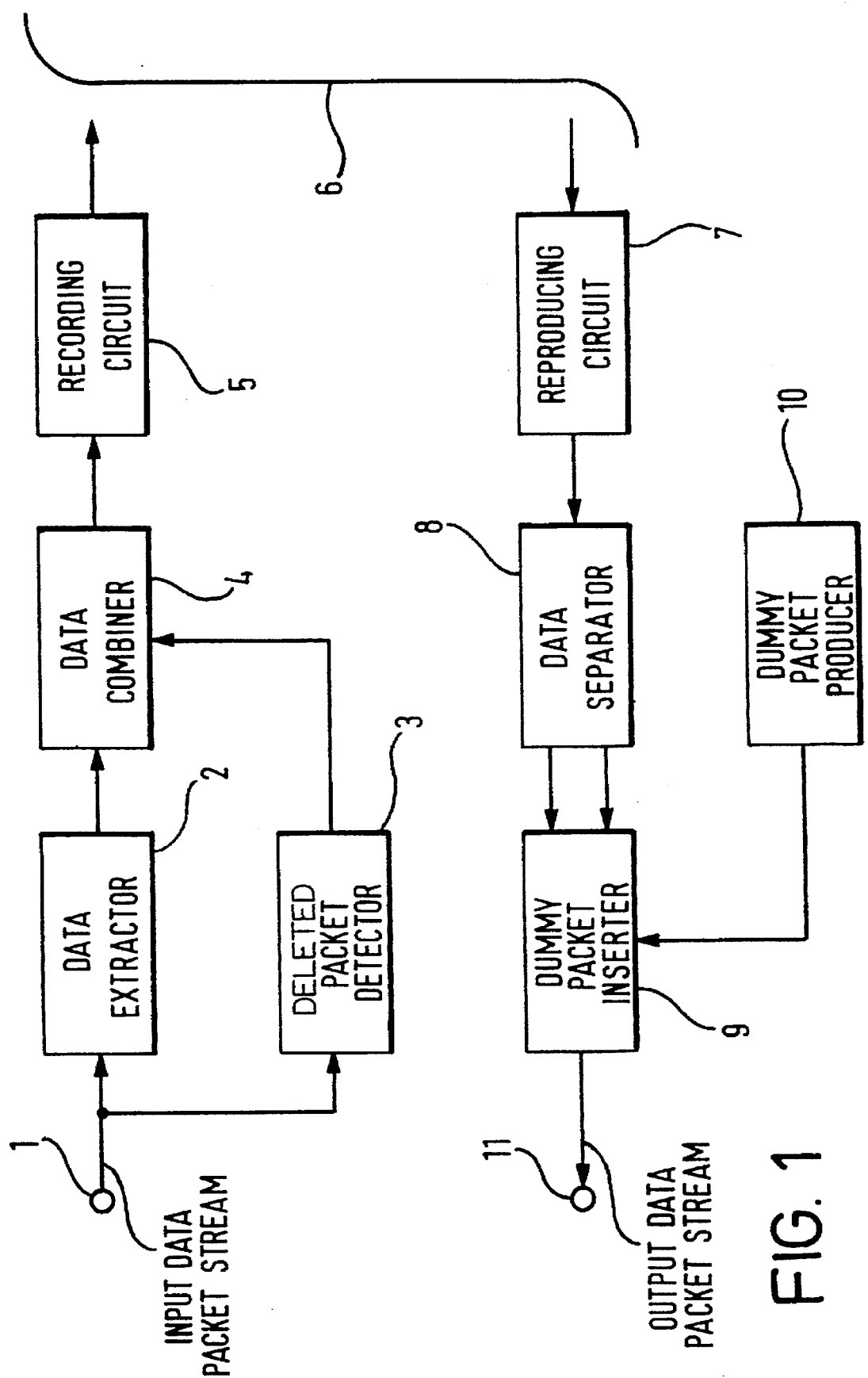
FIG. 1 is a block diagram showing an embodiment of a recording/reproducing apparatus for a data packet stream of the present invention.
Figure 4:
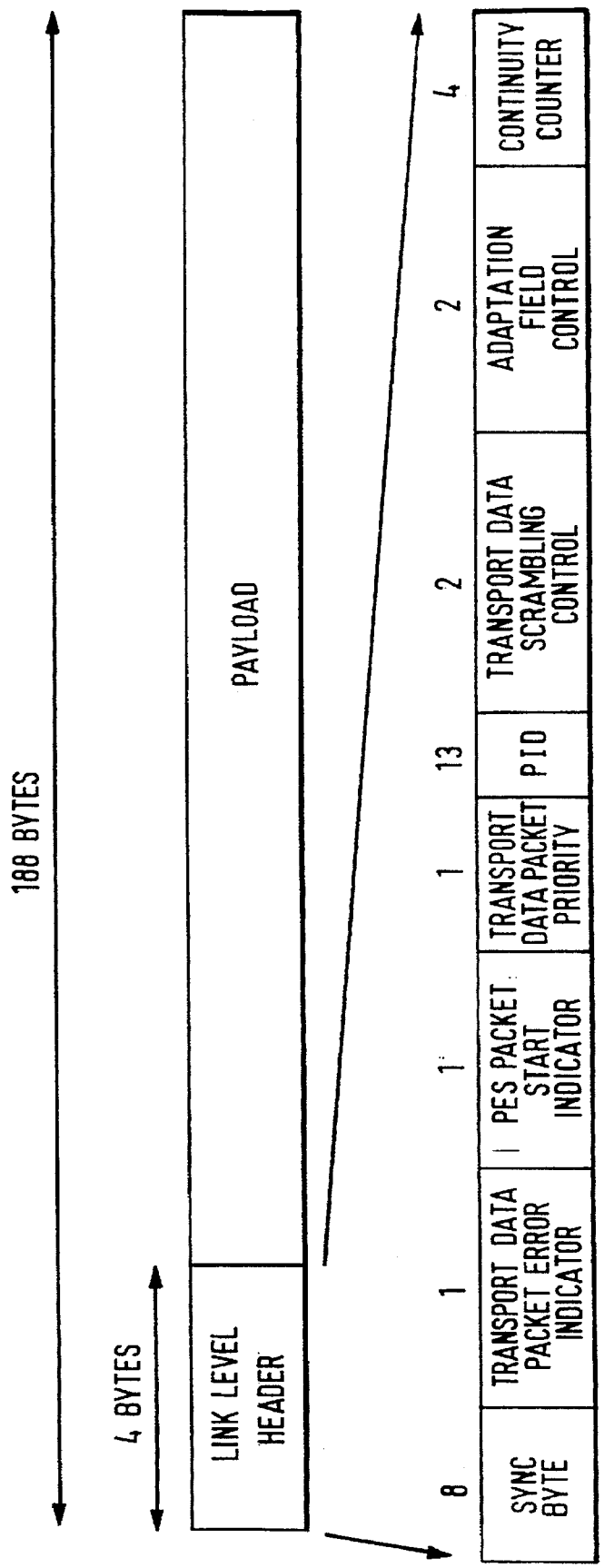
FIG. 4 is a diagram illustrating an MPEG2 standard transport data packet.

FIG. 1 shows a block diagram of one embodiment of a recording/reproducing apparatus for a data packet stream according to the present invention. This embodiment is specifically applied to the 6-mm type digital VTR.

A prescribed bit stream, for instance, a transport data stream of the MPEG2 standard is input to an input terminal 1. This input data packet stream is comprised of several types of data which have been time-division multiplexed into a stream of packets. The data interval between packets of the same type is established based on the decoding process time. The input data packet stream is supplied to a data extractor 2 and a deleted packet detector 3. The data extractor 2 extracts desired data from the different types of data contained within the input data packet stream and outputs the extracted data to a data combiner 4. For example, if a transport data stream of the MPEG2 standard is input, the data extractor 2 detects PIDs, and by extracting only packets that have a desired PID, outputs the extracted packets as extracted data.

The deleted packet detector 3 extracts the number of the non-extracted data packets that are in contiguous sequence between extracted data packets, (i.e., the interval between each of the extracted data packets). The decoder 3 then outputs the detected result. In other words, the decoder 3 outputs information relating to the number of deleted packets that are in contiguous sequence to the data combiner 4. The data combiner 4 combines the extracted data and the information relating to the number of deleted packets. If a transport data stream of the MPEG2 standard is input, the data combiner 4 reconstructs the transport data stream by assigning two of the extracted data packets to five recorded data packets (hereinafter referred to as a sync block) of a 6 mm digital VTR. Because the data area of a sync block is 77 bytes and an extracted data packet is composed of 188 bytes, there is a residual of several bytes when 2 extracted packets are assigned to five sync blocks (77×5−188×2=9). The data combiner 4 arranges the information of two deleted packets which this residual portion.

Further, on a digital VTR, error correction is performed for each sync block. If there is an uncorrectable error, data within the sync block is not used during the decoding process. Therefore, if any uncorrectable error occurs in a sync block that contains two extracted data packets, both of these extracted data packets will not be used during the decoding process. Accordingly, because the information relating to the number of deleted packets in contiguous sequence is used when the extracted data packets are decoded, the information relating to the number of deleted packets in contiguous sequence is arranged within a sync block that contains the two extracted data packets that contained the un-extracted data packets that were used to generate the information relating to the number of deleted packets in contiguous sequence therebetween.

The output of the data combiner 4 is supplied to a recording circuit 5. The recording circuit 5 outputs the input data after performing the error correction code adding process, modulation process, recording waveform equalizing process, etc. to the input data. The output from the recording circuit 5 is recorded on a magnetic tape 6, a recording medium on which a rotary transformer and a head (not shown) store data.

On the other hand in the reproducing system the magnetic tape 6 is traced by the head (not shown) and reproduced data is supplied to a reproducing circuit 7 through the rotary transformer. The reproducing circuit 7 performs a waveform equalizing process, a demodulation process, an error correction process, etc. to the reproduced data and outputs the data to a data separator 8. The data separator 8 separates each of the extracted data packets from the reproduced data and after separating the information relating to the number of deleted packets in contiguous sequence, outputs this information to a dummy packet inserter 9. For example, if the extracted data packets are transport data packets of the MPEG2 system, the data separator 8 separates two extracted data packets and two pieces of information relating to the number of deleted packets from five sync blocks of reproduced data and outputs the two extracted data packets and the pieces of information to the dummy packet inserter 9.

A dummy packet producer 10 outputs a dummy packet that is in the same format as a packet in the input data packet stream and has identification data indicating that it is of a different type than the extracted data packets. For example, when an input data packet stream has MPEG2 transport data packets, these packets can be made hulled within the decoding process when the dummy packet producer 10 controls prescribed bits of the Link Level Header. For example, if a "1" is set in the error indicator, it is possible to make this packet null by considering it to be an error packet. Further, the PID may be set at a different value from the extracted data packets. In this case, the dummy packet is disregarded during the decoding process. Further, the dummy packet producer 10 may output a 188 byte padding packet having a PID that indicates that it is a dummy packet. The dummy packet producer 10 may set the payload to be null data (for example, "FF" in hexadecimal).

The dummy packet inserter 9 inserts a number of dummy packets, based on the number of the deleted packets in contiguous sequence, into the sequence of extracted data packets from the data separator 8. In short, when an extracted data packet is input, the dummy packet inserter 9 restores the extracted data packet to its original rate and location within the input data packet stream by inserting a dummy packet in accordance with the number of deleted packets that were next to the extracted data packets in the input data packet stream and outputs the data via output terminal 11 as an output data packet stream.

Next, the operation of the embodiment with the above-described construction will be explained with reference to FIGS. 2 and 3. FIG. 2(a) shows the input data packet stream. FIG. 2(b) shows the extracted data packets. FIG. 2(c) shows the number of deleted packets in contiguous sequence. FIG. 2(d) shows the output of the data combiner 4. FIG. 2(e) shows the output of the reproducing circuit 7. FIG. 2(f) shows the extracted data packets from the data separator 8. FIG. 2(g) shows the information relating of the number of deleted packets in contiguous sequence. FIG. 2(h) shows the output data packet stream. Further, the cross-hatching portions, as shown in FIG. 2, indicate dummy packets. FIG. 3 shows the output of the data combiner 4.

The bit stream input through the input terminal 1 is supplied to the data extractor 2 and the deleted packet detector 3. It is assumed in this example that the input data packet stream in the MPEG2 system transport data stream, which includes transport data packets A1, A2, A3 . . . , which are based on the image A and the transport data packets B1, B2, B3 . . . , which are based on the image B, has been time-division multiplexed. It is also assumed that only image A is selected, and thus only the packets A1, A2, A3 . . . will be recorded.

The data extractor 2 extracts the packets A1, A2, A3 . . . by detecting the PIDs of all these packets and outputs these packets to the data combiner 4 (FIG. 2(b)). The deleted packet detector 3 detects the number of packets that are positioned between the extracted data packets and outputs information relating to the number of deleted data packets in contiguous sequence. For instance, only packet B1 is transmitted between the packets A2 and A3. Therefore, the number of deleted data packets in contiguous sequence between the packets A1 and A2 is 0. The number of deleted data packets in contiguous sequence between the packets A2 and A3, however, is 1.

The extracted data packets and the information relating to the number of deleted packets in contiguous sequence are combined in the data combiner 4. In this case, the data combiner 4 combines two extracted data packets and arranges, between these two packets, the number of non-extracted data packets in contiguous sequence (i.e., the number of deleted packets in contiguous sequence) that have been transmitted immediately before each of these two packets as shown in FIG. 2(d). The data combiner 4 assigns the two extracted data packets and the information relating to the number of the deleted packets to five sync blocks and supplies the packets and information to the recording circuit 5, as shown in FIG. 3. Further, FIG. 3 shows that the packets A5 and A6 are assigned to the 1st through the 5th sync blocks and the information of the number of deleted packets in contiguous sequence (2, 1), positioned between the extracted packets, have been arranged in the third sync block. These packets are recorded on the magnetic tape 6 through the head (not shown) by the recording circuit 5 after performing an error correction code adding process, a modulation process, a recorded wave equalizing process, etc. In this example, as shown in FIG. 2, the recording rate can be set to approximately one half (½) of the transmission rate.

At the time of reproduction, the data recorded on the magnetic tape 6 is reproduced by the head (not shown). The reproduction rate is the same as the recording rate. The reproducing circuit 7 supplies the reproduced data, as shown in FIG. 2, to the data separator 8 after performing a reproduced wave equalizing process, a demodulation process, and an error correction process. The data separator 8 separates the extracted data packets, as shown in FIG. 2(f), from the reproduced data and supplies the extracted data packets to the dummy packet inserter 9. Further, the data separator 8 separates the information relating to the number of deleted packets in contiguous sequence, as shown in FIG. 2(g), from the reproduced data and supplies this information to the dummy packet inserter 9.

The dummy packet producer 10 outputs, for example, a dummy packet with a PID that differs from the PID of the extracted data packets. The dummy packet inserter 9 inserts the dummy packet between the extracted data packets according to the information relating to the number of deleted packets in contiguous sequence. The information relating to the number of deleted packets in contiguous sequence preceding packet A2 is 0. Consequently, the dummy packet inserter 9 does not insert any dummy packets between packets A1 and A2 and arranges them continuously. Further, the information relating to the number of deleted packets recorded between packets A3 and A4 is 1 and 1. Therefore, the dummy packet inserter 9 inserts one dummy packet immediately before packet 3 and immediately before packet 4, respectively. Thus, as shown in FIG. 2(h), the dummy packet inserter 9 outputs packets A1 and A2 continuously, followed by one dummy packet, then packet A3, one dummy packet, and then packet A4. Thereafter, by repeating the foregoing steps, the output data packet stream, as shown in FIG. 2(h), is obtained. By supplying this output data packet stream to the MPEG2 decoder (not shown), packets A1, A2, A3 . . . are decoded and the image A is obtained.

The output rate of the output data packet stream is the same as the transmission rate. Further, as clearly seen from the comparison of FIG. 2(a) and (h), the transmission volumes of the input data packet stream and the output data packet stream are the same at all time intervals. In addition, packets A1, A2, A3 . . . are contained within the output data packet stream at the time interval required for the decoding process (i.e., the same intervals as in the input data packet stream) and thus the buffer of the MPEG2 decoder is prevented form overflowing or entering an underflow state.

As described above, in this embodiment the number of packets in contiguous sequence to be removed so they are not recorded (i.e., the number of deleted data packets in contiguous sequence) is obtained for each extracted data packet and is recorded together with the extracted data. Further, an output with a bit rate that is the same as the rate of the input data packet stream is obtained for the extracted data packets by inserting dummy packets in accordance with the number of the non-extracted data packets in contiguous sequence between the reproduced extracted data packets. Thus, it is possible to prevent the buffer from causing an overflow or underflow situation in the decoder. Furthermore, it becomes possible to stably detects the start of packets, etc. in the decoder as the output data packet streams become continuous and in the same transmission format as the input data packet stream.

Although the information relating to the number of deleted packets has been arranged between two extracted data packets in the embodiment described above, it is apparent that this information may be positioned, for instance, immediately before or immediately after extracted data packets.

As described above, the present invention has the ability to prevent the buffer of the decoder from causing an overflow or underflow situation, and also, has the ability to stabilize the decoding process by controlling the output rate of reproduced data.

As described above, the present invention is a preferable recording/reproducing apparatus for use with a data packet stream.

While what are at present considered to be preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicants as including a variety of individually inventive concepts, some of which may lie partially or wholly outside the scope of some or all of the following claims. The fact that the applicants have chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A recording/reproducing apparatus for a data packet stream comprising:

extracting means for extracting data packets of a selected type from an input packet train that includes different types of data packets that have been time-division multiplexed together;

recording means for recording the extracted data packets;

reproducing means for reproducing the extracted data packets that have been recorded by the recording means;

dummy packet producing means for producing dummy packets that correspond to the data packets that have not been extracted by the extracting means; and output means for outputting an output data packet train, which is produced by combining the extracted data packets that have been reproduced by the reproducing means and the dummy packets in accordance with the order in which the different types of data packets are positioned within the input packet train.

2. A recording/reproducing apparatus for a data packet stream as recited in claim 1, wherein each data packet of the input packet train includes identification data for identifying the type of data packet, and the dummy packets are positioned within the output data packet train at the same position where data packets containing undesired identification data are located within the input packet train.

3. A recording/reproducing apparatus for a data packet stream as recited in claim 2, wherein a rate at which the output means outputs the output packet train is the same as a rate of the input packet train.

4. A recording/reproducing apparatus for a data packet stream as recited in claim 1, wherein the dummy packets are produced based on null data.

5. A recording/reproducing apparatus for a data packet stream as recited in claim 4, wherein a rate at which the output means outputs the output packet train is the same as a rate of the input packet train.

6. A recording/reproducing apparatus for a data packet stream as recited in claim 1, wherein each data packet of the input packet train includes identification data for identifying the type of data packet, and the dummy packets are positioned within the output data packet train at the same position where data packets containing identification data that indicates null data are located within the input packet train.

7. A recording/reproducing apparatus for a data packet stream as recited in claim 6, wherein a rate at which the output means outputs the output packet train is the same as a rate of the input packet train.

8. A recording/reproducing apparatus for a data packet stream as recited in claim 1, wherein the input packet train includes a transport data stream that complies with an MPEG2 standard, and the dummy packet producing means produces the dummy packets based on PIDs that are included within the transport data stream.

9. A recording/reproducing apparatus for a data packet stream as recited in claim 8, wherein a rate at which the output means outputs the output packet train is the same as a rate of the input packet train.

10. A recording/reproducing apparatus for a data packet stream as recited in claim 1, wherein the input packet train includes a transport data stream that complies with an MPEG2 standard, and the dummy packet producing means produces the dummy packets based on portions of the transport data stream that are regarded as containing null data.

11. A recording/reproducing apparatus for a data packet stream as recited in claim 10, wherein a rate at which the output means outputs the output packet train is the same as a rate of the input packet train.

12. A recording/reproducing apparatus for a data packet stream as recited in claim 1, wherein the output means successively outputs the output packet train.

13. A recording/reproducing apparatus for a data packet stream as recited in claim 12, wherein a rate at which the output means outputs the output packet train is the same as a rate of the input packet train.

14. A recording/reproducing apparatus for a data packet stream as recited in claim 1, wherein a rate at which the output means outputs the output packet train is the same as a rate of the input packet train.

15. A recording/reproducing apparatus for a data packet stream comprising:

extracting means for extracting data packets of a selected type from an input packet train that includes different types of data packets that have been time-division multiplexed together;

detecting means for detecting the number of data packets in contiguous sequence that have not been extracted by the extracting means and are positioned between two of the extracted data packets;

combining means for outputting a combined data train by combining the extracted data packets with the detected number of data packets in contiguous sequence;

recording means for recording the combined data train;

reproducing means for reproducing the combined data train recorded by the recording means;

separation means for separating the extracted data packets and the detected number of data packets in contiguous sequence from the combined data train that has been reproduced by the reproducing means;

dummy packet producing means for producing dummy packets that correspond to the data packets that have not been extracted by the extracting means; and output means for outputting an output data packet train, which is produced by combining the extracted data packets that have been separated from the combined data train and the dummy packets in accordance with the order in which the different types of data packets are positioned within the input packet train.

16. A recording/reproducing apparatus for a data packet stream as recited in claim 15, wherein a rate at which the output means outputs the output packet train is the same as a rate of the input packet train.

17. A recording/reproducing apparatus for a data packet stream as recited in claim 15, wherein the combining means assigns a plurality of extracted data packets to a plurality of recorded data packets based on a size of each recorded data packet, and assigns the detected number of data packets in contiguous sequence between the plurality of extracted data packets to the recorded data packets to which the plurality of extracted data packets are assigned.

18. A recording/reproducing apparatus for a data packet stream as recited in claim 17, wherein:

the input data train includes a transport data stream that complies with an MPEG2 standard;

the recording means complies with a consumer-use high-definition digital video tape recorder standard; and the combining means assigns two selected data packets of the transport data stream to five sync-blocks, each sync-block being equal to one of the recorded data packets, and the combining means assigns the number of data packets in contiguous sequence between the two selected data packets of the transport data stream to one of the five sync-blocks that contains a portion of both of the selected data packets of the transport data stream.

19. A recording/reproducing apparatus for a data packet stream comprising:

a data extractor constructed and arranged to extract two data packets of a selected type from an input packet train that includes different types of data packets that have been time-division multiplexed together;

a deleted packet detector constructed and arranged to detect the number of data packets that are between the two data packets extracted by the data extractor;

a data combiner constructed and arranged to output a combined data train by combining the two extracted data packets with the detected number of data packets;

a recording circuit constructed and arranged to record the combined data train;

a reproducing circuit constructed and arranged to reproduce the combined data train recorded by the recording circuit;

a data separator constructed and arranged to separate the two extracted data packets and the detected number of data packets from the combined data train reproduced by the reproducing circuit;

a dummy packet producer constructed and arranged to produce dummy packets that correspond to the data packets that are between the two data packets extracted by the data extractor; and a dummy packet inserter constructed and arranged to output an output data packet train, which is produced by combining, in accordance with the order in which the different types of data packets are positioned within the input packet train, the two extracted data packets and the dummy packets.

20. A recording/reproducing apparatus for a data packet stream as recited in claim 19, wherein the data combiner assigns the two extracted data packets to a plurality of recorded data packets, and assigns the detected number of data packets to the plurality of recorded data packets.

21. A recording/reproducing apparatus for a data packet stream as recited in claim 20, wherein:

the data packets of the input data train comply with an MPEG2 standard;

the recording circuit complies with a consumer-use high-definition digital video tape recorder standard; and the data combiner is further constructed and arranged to assign:

the two extracted data packets to five sync-blocks, each sync-block being equal to one of the recorded data packets, and the number of data packets between the two extracted data packets to a selected sync-block that contains a portion of both of the extracted data packets.

22. A recording/reproducing apparatus for a data packet stream as recited in claim 21, wherein:

the data combiner is further constructed and arranged to assign, to the selected sync-block, the number of data packets between one of the two extracted data packets and a preceding data packet that is of the same type as the two extracted data packets.

* * * * *